United States Patent
Bristow et al.

(10) Patent No.: US 11,900,821 B2
(45) Date of Patent: Feb. 13, 2024

(54) FLEET CONTROLLER

(71) Applicant: Textron Innovations Inc., Providence, RI (US)

(72) Inventors: Grant Mark Bristow, Benbrook, TX (US); Matthew David Holvey, North Richland Hills, TX (US); Naveed Ahmed Siddiqui, Dallas, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 22 days.

(21) Appl. No.: 17/684,088

(22) Filed: Mar. 1, 2022

(65) Prior Publication Data

US 2022/0238030 A1     Jul. 28, 2022

Related U.S. Application Data

(63) Continuation of application No. 16/720,543, filed on Dec. 19, 2019, now Pat. No. 11,288,972.

(51) Int. Cl.
*G08G 5/00* (2006.01)
*G05D 1/10* (2006.01)
*G07C 5/02* (2006.01)
*H04W 24/08* (2009.01)

(52) U.S. Cl.
CPC ........... *G08G 5/0069* (2013.01); *G05D 1/101* (2013.01); *G07C 5/02* (2013.01); *G08G 5/0013* (2013.01); *H04W 24/08* (2013.01)

(58) Field of Classification Search
CPC .. G08G 5/0069; G08G 5/0013; G08G 5/0026; G08G 5/0034; G08G 5/0043; G08G 5/0056; G08G 5/006; G08G 5/0091; G05D 1/101; G05D 1/104; G07C 5/02; H04W 24/08
USPC .......................................................... 701/3
See application file for complete search history.

(56) References Cited

U.S. PATENT DOCUMENTS

| | | | |
|---|---|---|---|
| 6,609,051 B2 | 8/2003 | Fiechter et al. |
| 8,340,948 B1 | 12/2012 | Song et al. |
| 10,217,066 B1 | 2/2019 | Margherio et al. |
| 10,692,053 B2 | 6/2020 | Viswanath et al. |
| 10,956,855 B1 | 3/2021 | Coughran et al. |
| 10,984,338 B2 | 4/2021 | Morris, II et al. |
| 2008/0125933 A1 | 5/2008 | Williams et al. |
| 2011/0029804 A1 | 2/2011 | Hadden et al. |
| 2014/0316616 A1 | 10/2014 | Kugelmass |

(Continued)

FOREIGN PATENT DOCUMENTS

| | | |
|---|---|---|
| WO | 2019089677 A1 | 5/2019 |
| WO | 2019143752 A1 | 7/2019 |
| WO | 2020160778 A1 | 8/2020 |

*Primary Examiner* — Tyler D Paige
(74) *Attorney, Agent, or Firm* — SLATER MATSIL, LLP

(57) ABSTRACT

An method for controlling an autonomous vehicle fleet, including obtaining, by a fleet controller, from a master schedule, a mission for a vehicle of a fleet of autonomous vehicles, where the mission is associated with a mission entry of the master schedule, generating vehicle commands according to mission parameters associated with the mission, maintaining a persistent connection with the vehicle, sending the vehicle commands to the vehicle using the connection, the vehicle commands causing the vehicle to execute the mission under control of the fleet controller, and monitoring operation of the vehicle during performance of the mission.

20 Claims, 4 Drawing Sheets

(56) References Cited

U.S. PATENT DOCUMENTS

| | | |
|---|---|---|
| 2015/0234387 A1 | 8/2015 | Mullan et al. |
| 2015/0336671 A1* | 11/2015 | Winn .................... B64C 39/024 |
| | | 701/3 |
| 2015/0339933 A1* | 11/2015 | Batla .................... G08G 5/0082 |
| | | 701/120 |
| 2016/0107750 A1* | 4/2016 | Yates .................... B64C 39/024 |
| | | 244/2 |
| 2016/0117931 A1* | 4/2016 | Chan .................... G08G 5/0043 |
| | | 701/120 |
| 2016/0147404 A1 | 5/2016 | Keune |
| 2016/0209220 A1 | 7/2016 | Laetz |
| 2016/0247404 A1 | 8/2016 | Srivastava et al. |
| 2016/0364989 A1 | 12/2016 | Speasl et al. |
| 2017/0166328 A1 | 6/2017 | Ethington et al. |
| 2017/0168480 A1 | 6/2017 | Wanstedt et al. |
| 2019/0130515 A1 | 5/2019 | Haggiag |
| 2019/0188581 A1 | 6/2019 | Chabin et al. |
| 2019/0197798 A1 | 6/2019 | Abari et al. |
| 2019/0220036 A1 | 7/2019 | Weslosky et al. |
| 2019/0235488 A1 | 8/2019 | Beth et al. |
| 2019/0339720 A1 | 11/2019 | Petersen et al. |
| 2020/0075027 A1 | 3/2020 | Arantes et al. |
| 2020/0126326 A1 | 4/2020 | Lavie |
| 2020/0372428 A1 | 11/2020 | Liu et al. |
| 2021/0192405 A1 | 6/2021 | Bristow et al. |
| 2021/0192962 A1 | 6/2021 | Bristow et al. |
| 2022/0114506 A1 | 4/2022 | Villa et al. |
| 2022/0147897 A1 | 5/2022 | Liebman et al. |

* cited by examiner

FLEET CONTROLLER

CROSS-REFERENCE TO RELATED APPLICATIONS

This application is a continuation application and claims the benefit of U.S. application Ser. No. 16/720,543, filed on Dec. 19, 2019, which application is hereby incorporated herein by reference.

TECHNICAL FIELD

The present invention relates generally to a system and method for scheduling and controlling individual autonomous vehicles in a fleet, and, in particular embodiments, to a system and method for anticipating demand for cargo and passenger transportation by autonomous flying vehicles, and controlling the autonomous vehicles accordingly

BACKGROUND

The increasing availability of electric-powered vehicles and improved remote vehicle control capabilities has recently led to increasing use of autonomous vehicles and development of autonomous vehicle fleets. The cost and complexity of autonomous vehicles, coupled with the increasing size of vehicle fleets calls for centralized fleet management systems.

SUMMARY

An embodiment method includes obtaining, by a fleet controller, from a master schedule, a mission for a vehicle of a fleet of autonomous vehicles, where the mission is associated with a mission entry of the master schedule, generating vehicle commands according to mission parameters associated with the mission, maintaining a persistent connection with the vehicle, sending the vehicle commands to the vehicle using the connection, the vehicle commands causing the vehicle to execute the mission under control of the fleet controller, and monitoring operation of the vehicle during performance of the mission.

An embodiment device may be a fleet controller, including a processor and a non-transitory computer-readable storage medium storing a program to be executed by the processor. The program may include instructions for obtaining, from a master schedule, a mission for a vehicle of a fleet of autonomous vehicles, where the mission is associated with a mission entry of the master schedule, generating vehicle commands according to mission parameters associated with the mission, maintaining a persistent connection with the vehicle through a communications network, sending the vehicle commands to the vehicle using the connection, the vehicle commands causing the vehicle to execute the mission under control of the fleet controller, and monitoring operation of the vehicle during performance of the mission.

An embodiment system includes a vehicle, a communications network, and a fleet controller in communication with the vehicle by way of the communications network. The fleet controller may be configured to obtain, from a master schedule, a mission for a vehicle of a fleet of autonomous vehicles, where the mission is associated with a mission entry of the master schedule, generate vehicle commands according to mission parameters associated with the mission, maintain a persistent connection with the vehicle through the communications network, send the vehicle commands to the vehicle using the connection, with the vehicle being configured to receive the vehicle command and execute the mission according to the vehicle commands, and monitor operation of the vehicle during performance of the mission.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
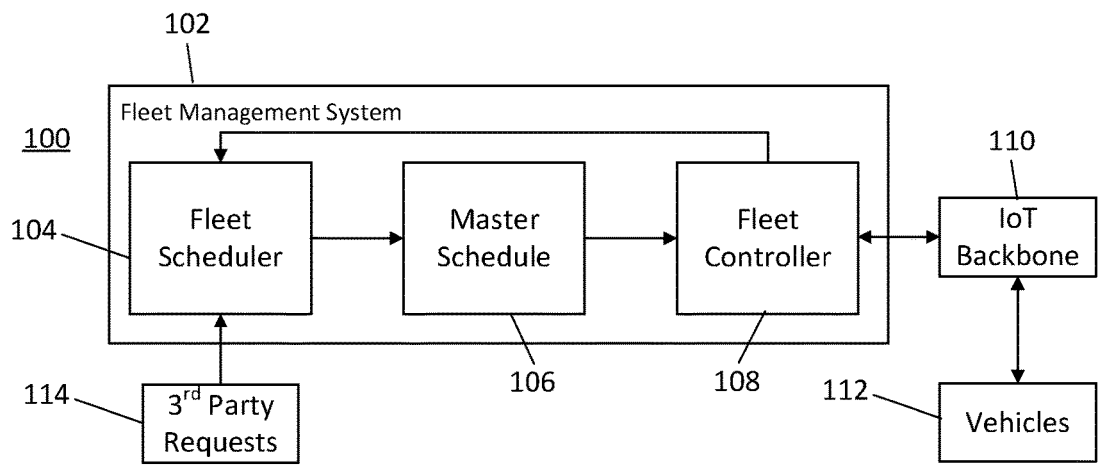
FIG. 1 illustrates an arrangement of a fleet management system for command and monitoring of one or more vehicles according to some embodiments.

Embodiments of a fleet management system are described herein, with the fleet management system providing control and monitoring of autonomous vehicles to optimize the effective use of the vehicles, while maintaining safety and maintenance standards. While some embodiments of the fleet management system are described as being directed to control and monitoring of flying vehicles, such as drones, aircraft, rotorcraft, or the like, it should be understood that the principles described herein are equally applicable to watercraft, ground vehicles, or mixed fleets including any number or combination of flying vehicles, ground vehicles, and watercraft.

In some embodiments, the fleet management system provides a persistent connection with each vehicle, which may include real-time, near real-time, monitoring, or tracking last known statuses of vehicles for use in the case of a connection failure by the vehicle. The fleet management system may permit a user to control vehicles from various interaction mediums such as tablets, augmented reality (AR) headsets, laptops, desktops, control centers, or the like.

Some embodiments of the fleet management system permits assignment of role-based access for command and control of vehicles to segregate users into various roles and allow management of user access to vehicles controlled by the fleet management system. The fleet management system may also use a control arbitrator to ensure a single point of control of a vehicle at any one time to prevent contradictory command or control from different users or sources. Additionally, the fleet management system may permit role based access to command or control of vehicles, with different roles being permitted different levels of control or authority over the vehicles.

In some embodiments, the fleet management system provides for tracking, monitoring and management at the device level, with individual connected components on each vehicle being tracked and monitored to provide for part localization, tracking of component location (such as in vehicle, in repair, or the like), protection against fraudulent or counterfeit parts, lifecycle management of individual parts, or the like. These individual components may be connected components that self-identify on the vehicle and use the vehicle datalink to send component telemetry. In some embodiments, each of the connected components may include a unique device identity, which may be represented by an on-device certificate, such as an X.509 public key certificate or the like. The tracking of individual connected components and the reporting of connected component telemetry to the fleet management system permits the tracking of complete component histories for the lifetimes of each of the connected components, which may be made available via a cloud data storage system as a cloud-based component logbook.

Additionally, the tracking of individual connected components may include storing device performance, use or maintenance history, and the like, for use by prediction services such as a fleet scheduler, active connected component health monitoring, predictive maintenance, and the like. Tracking the histories of the connected components and having access to the connected component histories further permits software/firmware updates and the deployment and management of component-level systems.

FIG. 1 illustrates an arrangement 100 of a fleet management system 102 for command and monitoring of one or more vehicles 112 according to some embodiments. The fleet management system 102 is a system for launching and sustaining continuous operations for fleets of autonomous vehicles. The fleet management system 102 may include a fleet scheduler 104 that generates, or submits entries to, a master schedule 106. The master schedule 106 is used by a fleet controller 108 to control one or more vehicles through a communications system such as an internet-of-things (IoT) backbone no. The vehicles 112 may feed operational data back through the IoT backbone no, which then delivers the operational data back to the fleet scheduler 104, or otherwise makes the operational data available to the fleet scheduler 104.

The fleet scheduler 104 monitors real-world data or mission impact data, including the operational data, and generates future-state predictions based on that data. The fleet scheduler 104 may then produce the optimized master schedule 106, which may include vehicle positions, mission timing, flight plans, maintenance and service (such as vehicle recharge/refuel) schedules, and the like, for fleet operations.

Additionally, the fleet scheduler 104 may include an API or other system for permitting third parties to submit third parties entries or requests to the master schedule, or requests for scheduling by the fleet scheduler 104. In some embodiments, third party requests 114 may be submitted directly to the master schedule 106, or may be submitted to the fleet scheduler 104 for verification or scheduling. For example, a third party cargo carrier may submit a request to the fleet scheduler 104 for carrying a particular class of cargo at a particular time and location, and the fleet scheduler 104 may determine a vehicle 112 suitable for the requested mission, assign the mission to the vehicle, and submit the scheduled mission to the master schedule 106. In other embodiments, a third party may perform the mission generation and scheduling, and submit a mission entry to the master schedule 106 for execution by the fleet controller 108.

In some embodiments, the fleet scheduler 104 analyzes historical demand, such as payload or passenger movement between identified points, demand input such as manual user entry or integration with planning systems, and environmental data such as weather, public transit, or ground traffic, air traffic, and then outputs recommendations for vehicle placement across a region's nodes in anticipation of upcoming demand. This predictive modeling allows for anticipatory vehicle placement to handle future demand, avoiding the need to assign vehicles fixed, regular routes, which require a fixed schedule with a fixed number of vehicles. Such anticipatory positioning may also permit vehicles to be automatically prepositioned before an actual demand exists, rather than tasking vehicles to a particular site or assignment after demand occurs.

In some embodiments, the fleet scheduler 104 also monitors health characteristics of vehicle systems that are known to be associated with component degradation by analyzing real-time on-board sensor data in the operational data sent from the individual vehicles. The fleet scheduler 104 may apply machine learning to predict when the system or component is likely to fail or need maintenance, inspection or servicing. In such an embodiment, the fleet scheduler 104 uses predicted failure insights to determine when the vehicle 112 should be scheduled for maintenance or inspection in coordination with regular mission operations. Using data from operational vehicles permits the fleet scheduler 104 to correlate maintenance requirements for components/systems that follow similar maintenance cycles. This permits sequencing of vehicle maintenance downtime according to a predicted maintenance or servicing need at the fleet level, and the staggering or sequencing of scheduled maintenance activities ensures the fleet remains available to carry out daily mission operations.

The fleet controller 108 executes the master schedule 106, while also monitoring real-time air and ground conditions. The fleet controller 108 observes vehicles 112 of the fleet, weather conditions, and other operating factors or mission impact data, and will delay, redirect, or otherwise modify commands to the vehicles 112 if executing the master schedule 106 would result in unsafe or undesirable conditions. The fleet controller 108 executes the master schedule 106 by maintaining communication with the vehicles 112, monitoring the vehicles 112 in real-time or near real-time, and sending command instructions to the vehicles 112. The fleet controller 108 monitors real-time or near real-time fleet information regarding vehicle state, performance and health, progress of each flight, and the state of each vertiport or ground location. The fleet controller 108 looks for conflicts during vehicle operations that result in unsafe or undesirable conditions and deviates from the master schedule 106 as necessary to enact contingencies that ensure safe and desirable fleet operations. In this way, the fleet controller 108 works independently from the fleet scheduler 104 to ensure a second layer of safe operation.

Figure 2:
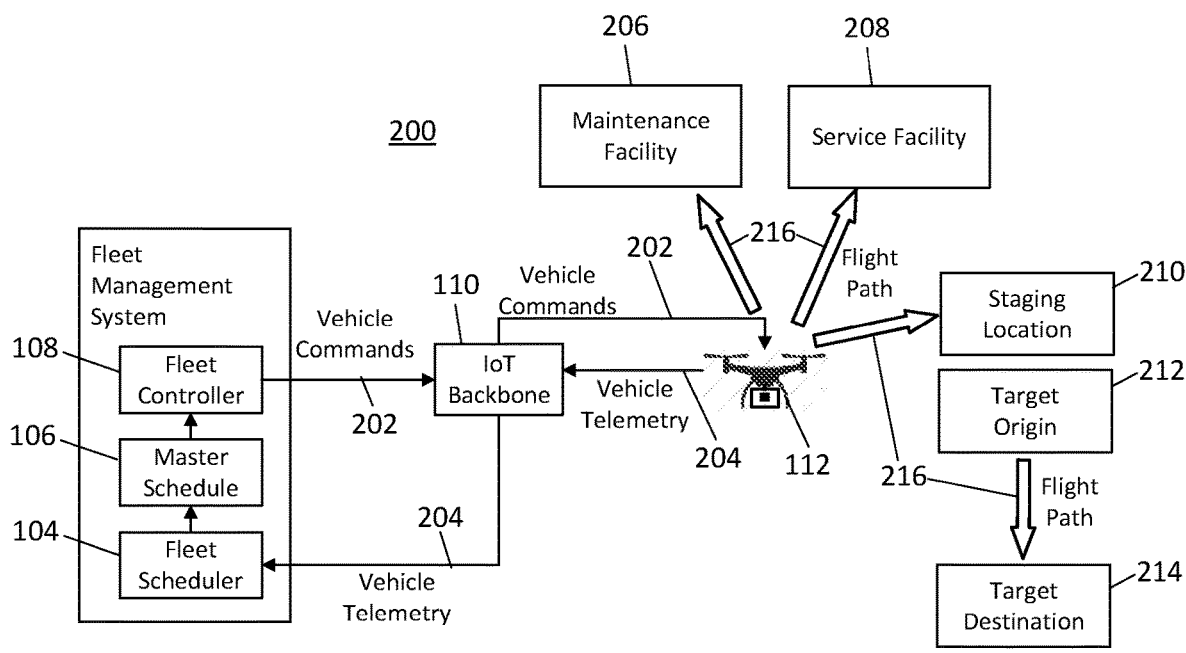
FIG. 2 illustrates operation of a fleet management system for control and monitoring of one or more vehicles according to some embodiments.

FIG. 2 illustrates operation of a fleet management system 102 for control and monitoring of one or more vehicles 112 according to some embodiments. The fleet management system 102 is in communication with one or more vehicles 112 via the IoT backbone 110. In some embodiments, the fleet scheduler 104 generates the master schedule 106 and the fleet controller 108 uses entries in the master schedule 106 to generate command instructions 202 which are sent to the vehicles 112. In some embodiments, the command instructions 202 are instructions to follow a particular flight path 216 to a destination, such as a maintenance facility 206, a service facility 208, a staging location 210 or a target origin 212, or for a mission between a target origin 212 and a target destination 214. For example, the fleet scheduler 104 may determine that a particular vehicle 112 has components in need of inspection or replacement, and may route the respective vehicle 112 to a maintenance facility 206. Similarly, the fleet scheduler 104 may determine from vehicle telemetry 204, or other data, that a battery of a vehicle 112 needs to be charged, that the vehicle 112 needs fuel, or the like, and may route the respective vehicle 112 to a service facility 208 or the like.

The fleet scheduler 104 may also provide entries in the master schedule 106 for missions such as passenger carriage, package or cargo pickup and delivery, and the like. In some embodiments, the fleet scheduler 104 may use predictive analytics to determine where potential demand exists. The fleet scheduler 104 may stage vehicles 112 at a staging location 210 associated with target origins 212 for missions between the target origins 212 and target destinations 214, or between the target origins 212 and target destinations 214 which are not determined at the time of predicted demand. For example, the fleet scheduler 104 may use a transit schedule, such as a train schedule, to predict that demand for passenger carriage or taxi service will peak shortly after a train arrives at a train station, and may send vehicles 112 to a staging location 210 near the train station, with the train station being a target origin 212 for a potential passenger carriage mission. Thus, the fleet scheduler 104 may be able to have vehicles 112 ready to accept passengers at the anticipate demand time, reducing passenger wait times. The fleet scheduler 104 may also use a weather service or weather forecast to predict that adverse weather conditions will increase demand for passenger carriage service at the train station, and may task additional vehicles 112 to the staging location 210 prior to a train's arrival to handle the anticipated increase in passenger carriage mission demand. In such situations, the target destination 214 may be input by a passenger after the passenger requests carriage, or after the passenger enters the vehicle 112. The fleet scheduler 104 may receive a request for a passenger carriage mission, may determine one or more vehicles 112 closest to the passenger's target origin 212, and may provide an entry in the master schedule 106 assigning the vehicle 112 to the passenger carriage mission at the target origin 212.

Similarly, cargo handling may be scheduled by the fleet scheduler 104, with cargo vehicles 112 being sent to staging locations 210 near post offices, warehouses, distribution points, or the like according to predicted demand. The fleet scheduler 104 may be tied into data inputs such as retailers, distributors, package delivery logistic systems, third party request or scheduling systems, cargo terminal systems, or the like, and may use the data inputs, solely or in combination with, environmental monitoring, historical data, and the like to determine predicted and or actual package delivery demand. For example, cargo vehicles 112 may be staged near restaurants near meal times to handle food deliveries without requiring that the vehicles 112 be routed to the pickup point after the cargo mission is requested. In another example, cargo vehicles 112 may be sent to staging locations 210 near retail warehouses, package delivery hubs, or the like, to handle delivery of cargo or packages, with the number of vehicles 112, staging locations 210 and arrival times determined by the fleet scheduler 104 according to anticipated and/or actual demand.

Figure 3A:
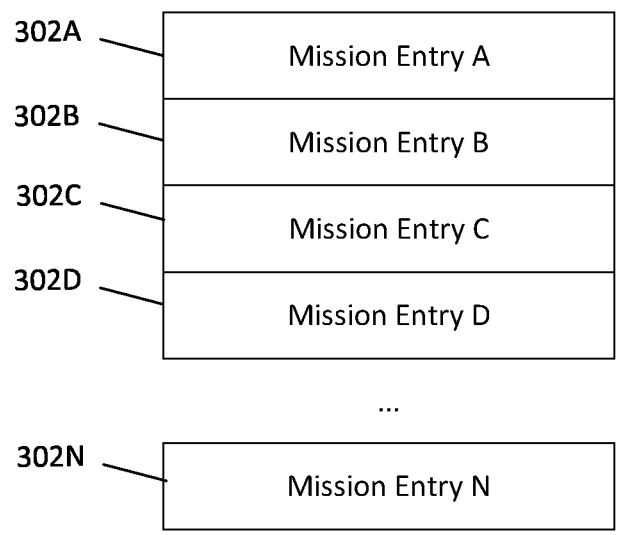
FIG. 3A illustrates an embodiment of a master schedule.
Figure 3B:
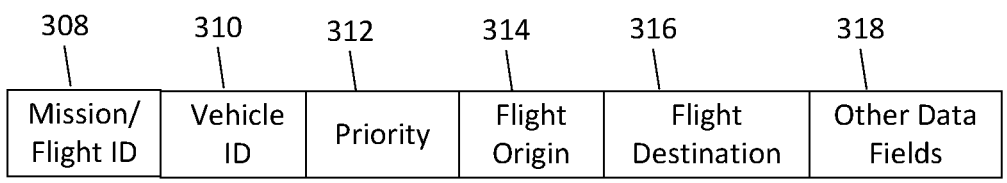
FIG. 3B illustrates an embodiment of a mission entry in the master schedule.

FIG. 3A illustrates an embodiment of a master schedule 106. FIG. 3B illustrates an embodiment of a mission entry 302 in the master schedule 106. The master schedule 106 may have one or more mission entries 302A . . . 302N set by the fleet scheduler 104. Each mission entry 302 may include data fields such as a mission identifier (ID) field 308, a vehicle ID field 310, a priority field 312, a flight origin field 314, a flight destination field 316, and one or more other data fields 318. The mission ID field 308 may uniquely identify a specific mission which is stored in the master schedule 106. The vehicle ID field 310 identifies a specific vehicle which will perform the specific mission. The vehicle ID field 310 may uniquely identify the specific vehicle 112 to allow the fleet controller 108 to control the specific vehicle 112 and permit the fleet scheduler 104 to track usage and anticipated location of the specific vehicle 112.

The priority field 312 may include data identifying a priority of the mission so that the fleet controller 108 handles mission entries 302 in the priority order. In some embodiments, the priority field 312 may indicate that the mission is an immediate mission instructing the fleet controller 108 to handle the mission entry 302 with the highest priority or immediately.

The mission entry 302 may also have locations in the flight origin field 314 identifying where the vehicle 112 should be sent for the mission. In some embodiments, the flight destination field 316 may also have a location for the end location of the mission. However, in further embodiments, the flight destination field 316 may be left blank at the beginning of the mission. Leaving the flight destination field 316 blank may indicate that the mission route or destination is to be determined on-the-fly. For example, in a passenger carriage mission, a passenger may identify a destination after the mission is scheduled, or after the mission begins. The mission entry 302 may also include other data fields 318 with maybe used for supplemental data, or additional mission data such as data identifying mission start or end time, a particular flight route, account number for a particular mission, a mission identifier, requirements for the mission, or the like.

Figure 4:
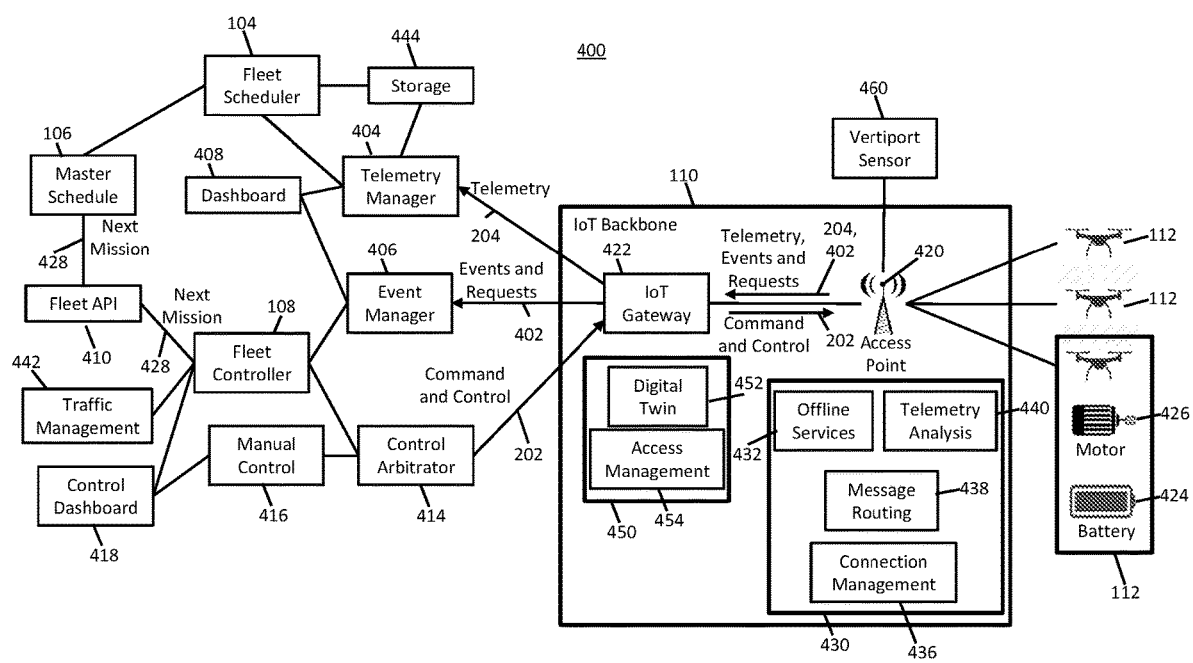
FIG. 4 illustrates operation of a system using the fleet controller according to some embodiments.

FIG. 4 illustrates operation of a system 400 using the fleet controller 108 according to some embodiments. The system 400 includes an IoT backbone no connecting one or more vehicles 112 to a control side subsystem that includes the fleet controller 108. In some embodiments, the vehicles 112 may be in communication with the IoT backbone no by way of a wireless connection to an access point 420 of the IoT backbone no. The access point 420 may be a cellular system provided by a third party, may be a dedicated system for control of the vehicles 112, or may be a hybrid system, or another communications system. The access point 420 communicates with an IoT gateway 422 of the IoT backbone no, which provides communication with the control side subsystem and routing of messages and commands to the appropriate destinations.

The vehicles 112 may include one or more connected components such as a motor 426 or a battery 424. In some embodiments, the connected components may have one or more sensors that measure operational parameters of the connected components. In other embodiments, a separate device, such as a monitoring circuit, may monitor the operational parameters of the connected components. For example, a vehicle may have an electric motor 426 and may also have current and revolutions per minute (RPM) monitoring circuits that are either disposed on the motor 426 or as part of one or more monitoring circuits separate from the motor 426. The current and RPM monitoring circuits may monitor the current and RPM operational parameters of the motor 426, and the vehicle 112 may report the operational parameter data as telemetry through the IoT gateway 422 back to the control side subsystem for storage and analysis. In other embodiments, the vehicles 112 may report operational parameters such as location, altitude, airspeed, and the like, for use by the control side subsystem in tracking and verifying the location and control of the vehicles 112.

The vehicles 112 may generate event messages or request information from the control side subsystem. The vehicles 112 transmit reporting data such as the telemetry, events, and requests to the access point 420, which communicates the reporting data to the IoT gateway 422 for routing to the appropriate control side element. Events may include, for example, emergency events such as an unexpected lack of battery charge or component failure, an accident, an unexpected or uncontrollable deviation from the assigned flight path or mission, or the like. An event many also include mission related events such as reaching a designated start point, end point, or transit point in a mission, completion of a mission, acceptance of, or delivery of, a cargo package, loading or unloading of a passenger, a change to an anticipated or current mission such as a passenger changing a passenger carriage destination, or the like.

One or more vertiport sensors 460 may also be connected to the access point 420, and may report telemetry 204 and event data 402 through the IoT backbone no to the control side subsystem. For example, a vertiport, such as a storage facility, maintenance facility, service facility, regular staging location, or the like, may have sensors that detect and report the arrival of a vehicle 112 so that the control side subsystem may verify the arrival of a vehicle 112. In other embodiments, the vertiport may have weather monitoring equipment, and may report environmental conditions at the vertiport to provide finer grained weather reporting than may be available from third party services. In yet another embodiment, the vertiport may report on the conditions of vehicles 112 at the vertiport, demand for cargo or passenger missions at the vertiport, or the like. The IoT backbone no communicates telemetry, events and requests from the vertiport sensors 460 and the vehicles to the IoT gateway 422 for distribution to the relevant elements of the control side subsystem. The IoT backbone no also communicates command and control instructions 202 received at the IoT gateway 422 to the relevant access point 420 for delivery to the appropriate vehicle 112.

In some embodiments, the IoT backbone no includes one or more access points 420 and one or more IoT gateways 422. The access points 420 may be, for example, cellular access points, micro, macro, or femto cell base stations, WiFi base stations, Bluetooth stations, or any other communications transmission system. Thus, an IoT gateway 422 may connect to one or more existing wireless communications networks, or may connect to a dedicated wireless network, or a combination of a dedicated wireless network and an existing wireless network to provide broad coverage and bandwidth capabilities for the system 400.

The access point 420 may, in some embodiments, provide edge decision making and edge services 430 such as offline services 432 for maintaining the vehicles in a safe state if the control side subsystem disconnects from the IoT backbone no, telemetry analysis 440 to rapidly determine and address of emergencies with the vehicles 112, message routing 438 for directing messages to an appropriate IoT gateway 422 or vehicle 112, and connection management 436 for handling connections to the vehicles 112 or monitoring for loss of a connection to the vehicles 112. The access point 420 may analyze the classification of events and requests 402 to determine whether a priority of the event or request 402 is of a predetermined level, or whether the severity or type of event or request 402 falls into a category handled by the access point 420. For events handled by the access point 420, the access point 420 may apply a predetermined rule or procedure. Additionally, the access point 420 may hold or forward a message according to the classification of the event or request 402. For example, a vehicle 112 may detect that an assigned landing space at a target location is occupied or obscured, and may request permission to land at a different location. The access point 420 may determine that it has an assigned rule for handling such a request and may grant that request if the access point 420 determines that the different location is available. The access point 420 may check with another element such as a traffic management system, unmanned aircraft system (UAS) traffic management (UTM), or the like, and the permission or denial of the request to change the landing locations may be based on the access point check.

The IoT gateway 422 may, in some embodiments, provide gateway services 450 such as digital twin services 452 for recording the last state of a vehicle 112 and reporting the last state or status of the vehicle 112 back to the control side subsystem in the case of loss of a connection with the vehicle 112. In some embodiments, the last vehicle status is a most recent status of the vehicle, and may include one or more of a location, a speed, an altitude, a heading, or vehicle telemetry. The IoT gateway 422 may also provide other gateway services 450 such as access management services 454 for handling security and controlling access to the vehicles or control side subsystem.

The IoT gateway 422 routes messages sent by the vehicles 112 through the access point 420 to the relevant elements in the control side subsystem. In some embodiments, events and requests 402 may be routed to an event manager 406, and telemetry 204 data may be routed to a telemetry manager 404. The IoT gateway 422 may also route control message or command instructions 202 from a control arbitrator 414 through the IoT backbone no to the relevant vehicle 112.

The telemetry manager 404 and event manager 406 may each provide data to a dashboard 408 for presentation to a user monitoring the status of the system 400, including missions and vehicles 112. Thus, relevant events and requests 402 and telemetry 204 may be presented to a user at the dashboard 408 as a data visualization.

The telemetry manager 404 may also provide the telemetry 204 data to storage 444, where current telemetry 204 is stored with past telemetry to permit the fleet scheduler 104 to access historical data or operational history data in generating the master schedule 106. The operational history data may include flight duration, payload loading time, a history of on-time or delayed flights, and the like. Additionally, the telemetry manager 404 may provide live, current telemetry 204 directly to the fleet scheduler 104 for generation of mission entries for the master schedule 106. In some embodiments, the event manager 406 provides event and request 402 data to the fleet controller 108.

The fleet controller 108 obtains entries from the master schedule 106 for execution as a next mission 428. In some embodiments, the fleet controller 108 executes missions in the master schedule 106 according to a priority of the missions, and may pre-empt lower priority missions for higher priority missions or directly submitted missions.

In some embodiments, the fleet controller may obtain the next mission 428 from the master schedule 106 through a fleet application programming interface (API) 410, and in other embodiments, may obtain the next mission 428 directly from the master schedule 106, or from another schedule or mission source such as a third party scheduling system or as a direct mission request from, for example, a control dashboard 418 or the like. The fleet controller 108 may generate a flight path for the next mission 428 according to information from a traffic management system 442, the control dashboard 418, historical mission information, and the like. For example, the fleet controller 108 may retrieve a next mission 428 entry indicating that a particular vehicle should move to arrive at a target location at a predetermined time. The fleet controller 108 may identify a particular flight path for the mission, and may verify the usability of the flight path with the traffic management system 442, such as a UTM. A UTM may provide data or flight path checking related to traffic in a flight path, availability of a flight path due to flight restrictions or the like, weather, requirements for a flight path such as weight or size, minimum or maximum altitude or airspeed, or the like. For example, the UTM may indicate that the flight path has an unexpected volume of traffic, and the fleet controller 108 may determine an alternative flight path using data from the UTM, historical flight data, predetermined flight paths, or the like, or a combination of any of the same. Alternatively, the fleet controller 108 may determine that flight conditions, such as weather, wind, or the like, indicate that the flight path is unacceptable for flight operations, the fleet controller 108 may attempt to find a new, more acceptable flight path, may delay the mission, or may replace or cancel the mission.

In some embodiments, the control dashboard 418 may be an interface that permits a user to submit mission entries directly to the fleet controller 108, or to take manual control, through a manual control system 416, of a particular vehicle 112. The manual control system 416 permits operator-in-the-loop control, which may allow for precise control of a particular vehicle 112.

The fleet controller 108 may send command and control messages 202 to the IoT gateway 422 through a control arbitrator 414. The control arbitrator 414 may receive control messages or command instructions 202 from the manual control system 416 after receiving or executing an existing set of command instructions 202 from the fleet controller 108, or may receive command instructions 202 from the fleet controller 108 and manual control system 416 substantially simultaneously. The control arbitrator 414 determines which set of command instructions 202 has greater authority, and forwards the command instructions 202 with greater authority to the IoT gateway 422. In some embodiments, the control arbitrator 414 may use a predetermined set of rules to determine which command instructions 202 have greater authority. For example, in an embodiment, the control arbitrator 414 may use a predetermined rule that give any command instructions with an emergency priority the highest priority, any non-emergency manual command the next highest priority, and any scheduled control instruction the lowest priority.

The elements of the system 400 may, in some embodiments, be implemented by a computer system. The computer system may have one or more processors and a non-transitory computer readable medium having a program stored thereon. The program may include instructions for performing the processes described herein. Additionally, one or more elements of the system 400 may be implemented as separate processes, programs or portions of one or more programs, or as separate programs on a computer or computer system having multiple computers. For example, the fleet controller 108 may be integrated with the control arbitrator 414, event manager 406, telemetry manager 404 or one or more other elements of the system 400. In another embodiment, the fleet controller 108 may be implemented on a first computer system, network, or in a first program, and any one or more of the control arbitrator 414, event manager 406, telemetry manager 404 may be disposed together, or separately on a second, separate computer system, network or in a second, separate program. Additionally, the fleet scheduler 104 and the fleet controller 108 may be integrated together, disposed on a same computer system in separate programs or processes, or disposed on separate computer systems or networks.

Figure 5:
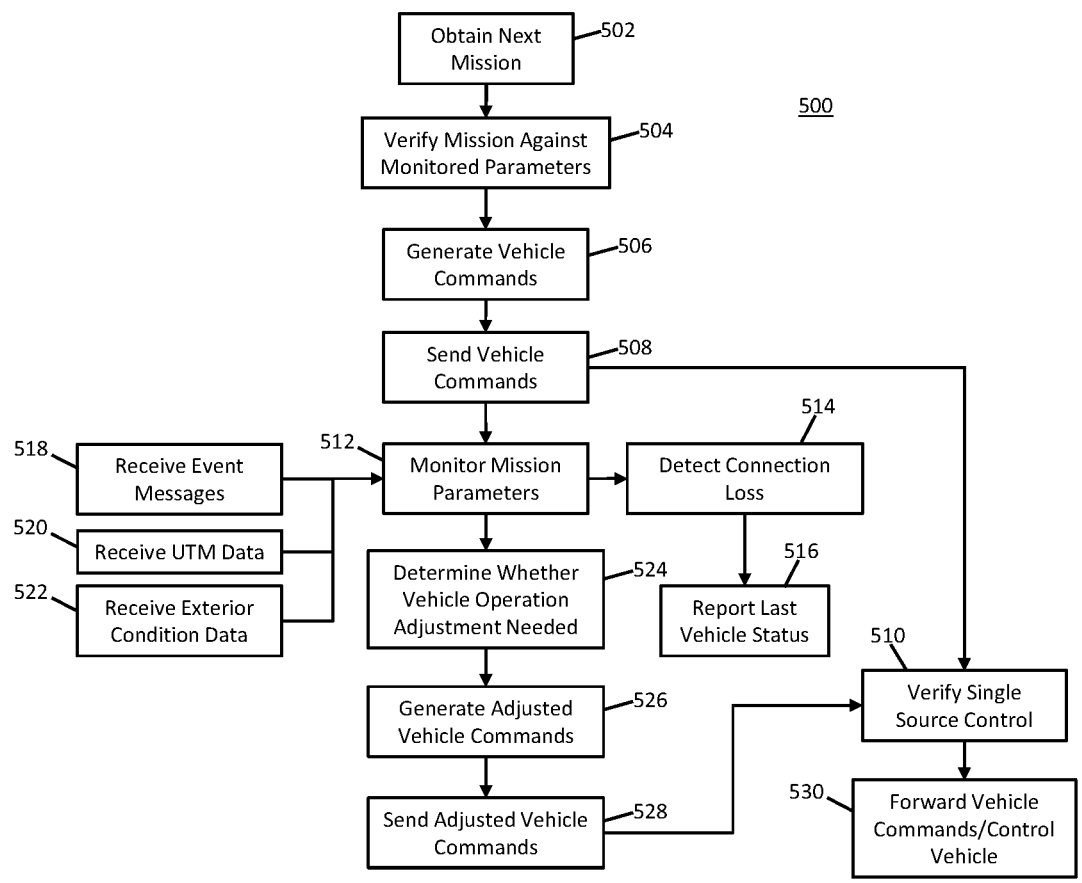
FIG. 5 is a flow diagram illustrating a method for handling vehicles missions in a fleet management system according to some embodiments.

FIG. 5 is a flow diagram illustrating a method 500 for handling vehicles missions in a fleet management system according to some embodiments. Initially, in block 502, the fleet controller obtains a next mission. In some embodiments, the fleet controller retrieves, or receives, a next mission from a master schedule, either directly, through an API, or through another element. In some embodiments, the next mission is a mission having a highest priority in the master schedule, and in other embodiments, the next mission is a mission submitted directly to the fleet controller by a user through the control dashboard.

In block 504, the mission is verified against monitored parameters or mission impact data. In an embodiment, the fleet controller compares the requirements of the next mission against monitored parameters such as traffic in a potential travel path, weather, flight restrictions or requirements along the potential travel path, capabilities of the assigned vehicle, geographic restrictions, and the like. For example, the mission may be verified using a UTM to verify that the potential flight path for the next mission is available and safe for the assigned vehicle. The fleet controller may attempt to modify the mission, select a new travel path that can be verified against the monitored parameters, reject the mission, reschedule the mission, or the like. The fleet controller may also apply geofencing restrictions on the vehicles using predetermined boundaries, using UTM data, or the like.

In block 506, vehicle commands are generated in response to the mission being verified against the monitored parameters. In some embodiments, generating the vehicle commands includes, but is not limited to, assigning one or more of a flight or travel path, speed, altitude, arrival or departure time, target origin or target destination, mission type, setting a flight path according to geofencing restrictions, or the like.

In block 508, the vehicle commands are sent to the vehicle. In some embodiments, the vehicle commands may be sent to a control arbitrator, and in block 510, the control arbitrator may verify that the vehicle associated with the vehicle commands is subject to single source control, and after verifying that the vehicle commands have proper authority, or are a single source of control for the relevant vehicle, may be forwarded to the vehicle, in block 530 to control the vehicle. In other embodiments, the vehicle commands may be sent or forwarded to the vehicle in block 530 without a control arbitrator to control the vehicle. The vehicle commands may be sent through the IoT backbone, which routes the vehicle commands to the relevant vehicle.

In block 512, the mission parameters are monitored by a monitoring element. In some embodiments, the fleet controller performs persistent monitoring of the operation of the individual vehicles and mission parameters during the mission to determine whether operation of a vehicle needs to be adjusted. The fleet controller performs persistent connection monitoring, and in block 514, detects connection loss to a particular vehicle by monitoring messaging to and from the vehicle. In block 516, the last vehicle status is reported when the connection is lost.

The fleet controller may use the connection management of the IoT backbone to detect the connection loss, or may use another connection monitoring technique. For example, the fleet controller may send a periodic message to each vehicle and monitor response messages, or may monitor for periodic message initiated by the vehicles. If a lost connection is detected, the last vehicle status reported status may be reported to, for example, the fleet controller, or the like. For example, the access point may perform connection monitoring, and report a lost connection with a last vehicle status, back to the fleet controller.

In some embodiments, when the connection between the vehicle and the IoT backbone is lost, the fleet controller may raise an exception, event or message, for example, at the dashboard, for investigation. In some embodiments, the fleet controller may assign a new vehicle to the mission of the vehicle associated with the lost connection, may request further instruction from a user, or the like.

In block 518, the monitoring element receives message events, in block 520, the monitoring element receives UTM data, and in block 522, the monitoring element receives exterior condition data. The event messages may include event messages or requests sent by a vehicle, or sent through the control dashboard or another system. The UTM data may include updates to flight paths or flight requirements for particular flight paths, traffic updates or data, and the like. The exterior condition data may include weather data and the like.

The monitoring element may verify that the mission parameters are supported during performance of the mission by mission impact data such as the received event messages, UTM data, and exterior condition data, and the like. In block 524, determines whether the vehicle operation adjustment is needed according to comparison between the mission parameters and the mission impact data. If vehicle operation adjustment is needed, then the fleet controller generates adjusted vehicle commands in block 528. In some embodiments, the fleet controller adjusts the vehicle commands according to at least one of the event messages, UTM data or exterior condition data so that the vehicle commands reflect mission parameters that are supported by the received data. In some embodiments, the fleet controller performs vehicle deconfliction, for example, by providing control messaging to vehicles to avoid each other in transit.

In block 528, the adjusted vehicles commands are sent to the vehicles. In some embodiments, the adjusted vehicle commands are sent to the control arbitrator, which, in block 510, verifies that the vehicle is subject to single source control. Once the adjusted vehicle commands are confirmed to be a result of single source control, the adjusted vehicle commands are forwarded to the vehicle in block 530 to control the vehicle. In another embodiment where the control arbitrator is omitted, the adjusted vehicle commands are forwarded to the relevant vehicle in block 530 to control the vehicle. Once the vehicle receives the vehicle commands or adjusted vehicle commands, the vehicle executes the commands to perform the mission.

An embodiment method includes obtaining, by a fleet controller, from a master schedule, a mission for a vehicle of a fleet of autonomous vehicles, where the mission is associated with a mission entry of the master schedule, generating vehicle commands according to mission parameters associated with the mission, maintaining a persistent connection with the vehicle, sending the vehicle commands to the vehicle using the connection, the vehicle commands causing the vehicle to execute the mission under control of the fleet controller, and monitoring operation of the vehicle during performance of the mission.

In some embodiments, the generating the vehicle commands includes identifying a flight path associated with the mission, verifying a usability of the flight path with a traffic management system, and generating the vehicle commands according to the flight path in response to verifying the usability of the flight path. In some embodiments, the obtaining the mission includes obtaining the mission from the master schedule according to a priority of mission entries in the master schedule. In some embodiments, the monitoring operation of the vehicle includes monitoring a connection of the vehicle to a communications network associated with the fleet controller. In some embodiments, the monitoring the connection includes monitoring, by an access point of the communications network, a connection between the vehicle and the access point, and reporting, by the access point, a last vehicle status to the fleet controller. In some embodiments, the monitoring operation of the vehicle includes determining, during performance of the mission, whether the mission parameters associated with the mission are supported by mission impact data received at the fleet controller, and the method further includes generating, in response to the mission parameters not being supported by the mission impact data, adjusted vehicle commands according to the mission impact data and the mission parameters, and sending the adjusted vehicle commands to the vehicle using the connection, the adjusted vehicle commands causing the vehicle to execute the mission under control of the fleet controller according to the adjusted vehicle command. In some embodiments, the sending the vehicle commands to the vehicle comprises determining whether the vehicle is subject to single source control, and forwarding the vehicle commands to the vehicle in response the vehicle being subject to the single source control or a source of the vehicle commands being assigned an authority greater than any other set of vehicles commands associated with the vehicle.

An embodiment device may be a fleet controller, including a processor and a non-transitory computer-readable storage medium storing a program to be executed by the processor. The program may include instructions for obtaining, from a master schedule, a mission for a vehicle of a fleet of autonomous vehicles, where the mission is associated with a mission entry of the master schedule, generating vehicle commands according to mission parameters associated with the mission, maintaining a persistent connection with the vehicle through a communications network, sending the vehicle commands to the vehicle using the connection, the vehicle commands causing the vehicle to execute the mission under control of the fleet controller, and monitoring operation of the vehicle during performance of the mission.

In some embodiments, the instructions for the generating the vehicle commands include identifying a flight path associated with the mission, verifying a usability of the flight path with a traffic management system, and generating the vehicle commands according to the flight path in response to verifying the usability of the flight path. In some embodiments, the instructions for the obtaining the mission include instructions for obtaining the mission from the master schedule according to a priority of mission entries in the master schedule. In some embodiments, the instructions for the monitoring operation of the vehicle include instructions for receiving, from an access point of the communications network, a last vehicle status in response to loss of a connection between the vehicle and the access point hosting the persistent connection. In some embodiments, the instructions for the monitoring operation of the vehicle include instructions for determining, during performance of the mission, whether the mission parameters associated with the mission are supported by mission impact data received at the fleet controller, and the program further includes instructions for generating, in response to the mission parameters not being supported by the mission impact data, adjusted vehicle commands according to the mission impact data and the mission parameters, and sending the adjusted vehicle commands to the vehicle using the connection, the adjusted vehicle commands causing the vehicle to execute the mission under control of the fleet controller according to the adjusted vehicle command. In some embodiments, the mission impact data includes at least one of received event messages, traffic management system data, or exterior condition data. In some embodiments, the instructions for the sending the vehicle commands to the vehicle includes determining whether the vehicle is subject to single source control, and forwarding the vehicle commands to the vehicle in response the vehicle being subject to the single source control or a source of the vehicle commands being assigned an authority greater than any other set of vehicles commands associated with the vehicle.

An embodiment system includes a vehicle, a communications network, and a fleet controller in communication with the vehicle by way of the communications network. The fleet controller may be configured to obtain, from a master schedule, a mission for a vehicle of a fleet of autonomous vehicles, where the mission is associated with a mission entry of the master schedule, generate vehicle commands according to mission parameters associated with the mission, maintain a persistent connection with the vehicle through the communications network, send the vehicle commands to the vehicle using the connection, with the vehicle being configured to receive the vehicle command and execute the mission according to the vehicle commands, and monitor operation of the vehicle during performance of the mission.

In some embodiments, the fleet controller is configured to identify a flight path associated with the mission, verify a usability of the flight path with a traffic management system, and generate the vehicle commands according to the flight path in response to verifying the usability of the flight path. In some embodiments, the fleet controller is configured to obtain the mission from the master schedule according to a priority of mission entries in the master schedule. In some embodiments, the fleet controller is configured to receive, from an access point of the communications network, a last vehicle status in response to loss of a connection between the vehicle and the access point hosting the persistent connection. In some embodiments, the fleet controller is configured to determine, during performance of the mission, whether the mission parameters associated with the mission are supported by mission impact data received at the fleet controller, generate, in response to the mission parameters not being supported by the mission impact data, adjusted vehicle commands according to the mission impact data and the mission parameters, and send the adjusted vehicle commands to the vehicle using the connection, with the vehicle being configured to execute the mission according to the adjusted vehicle command. In some embodiments, the system further includes a control arbitrator configured to determine whether the vehicle is subject to single source control, and forward the vehicle commands to the vehicle in response the vehicle being subject to the single source control or a source of the vehicle commands being assigned an authority greater than any other set of vehicles commands associated with the vehicle.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An autonomous vehicle fleet control method, comprising:
    obtaining, by a fleet controller a mission for a vehicle of a fleet of autonomous vehicles;
    identifying a flight path associated with the mission;
    verifying a usability of the flight path with an unmanned aircraft system (UAS) traffic management (UTM);
    modifying the flight path according to data from the UTM in response to the UTM indicating that the usability of the flight path is not verified; and
    controlling the vehicle according to the flight path by sending, through a control arbitrator, vehicle commands associated with the flight path to the vehicle, the controlling the vehicle causing the vehicle to execute the mission, wherein the control arbitrator forwards the vehicle commands to the vehicle in response to the control arbitrator determining that the vehicle is being controlled by a single source of commands.

2. The method according to claim 1, wherein the UTM performs checking on the flight path for requirements for use of the flight path, wherein the requirements for use of the flight path comprise at least one of weight, size, minimum or maximum altitude, or airspeed.

3. The method according to claim 1, further comprising monitoring operation of the vehicle during execution of the mission by at least monitoring a connection of the vehicle to a communications network associated with the fleet controller.

4. The method according to claim 3, wherein the monitoring the connection comprises receiving, by the fleet controller, from an access point that is of the communications network and that monitors a connection between the vehicle and the access point, a last vehicle status in response to the access point determining that the connection has been lost.

5. The method according to claim 4, further comprising assigning another vehicle to the mission in response to a loss of the connection.

6. The method according to claim 3, wherein the monitoring operation of the vehicle comprises determining, during performance of the mission, whether mission parameters associated with the mission are supported by mission impact data received at the fleet controller; and
    wherein the method further comprises:
        generating, in response to the mission parameters not being supported by the mission impact data, adjusted vehicle commands according to the mission impact data and the mission parameters; and
        sending the adjusted vehicle commands through the control arbitrator to the vehicle using the connection, the adjusted vehicle commands causing the vehicle to execute the mission under control of the fleet controller according to the adjusted vehicle commands.

7. The method according to claim 6, wherein the sending the adjusted vehicle commands to the vehicle comprises:
    determining, by the control arbitrator, whether the vehicle is subject to single source control by ensuring that vehicle commands sent to the vehicle result in the vehicle being subject to a single point of control at any one time; and
    send the adjusted vehicle commands to the vehicle in response the vehicle being subject to the single source control, and further in response to the control arbitrator determining that the adjusted vehicle commands have proper authority, the adjusted vehicle commands causing the vehicle to execute the mission under control of the fleet controller according to the adjusted vehicle commands.

8. An autonomous vehicle fleet control method, comprising:
controlling, by a fleet controller, a vehicle of a fleet of autonomous vehicles according to a flight path associated with a mission for the vehicle, the controlling the vehicle causing the vehicle to execute the mission according to mission performance requirements;
monitoring, by the fleet controller, operation of the vehicle during performance of the mission;
monitoring, by the fleet controller, mission parameters associated with the mission, wherein the monitoring the mission parameters comprises monitoring at least operation of the vehicle during performance of the mission and mission performance requirements;
receiving mission impact data comprising at least one of an event message or updated unmanned aircraft system (UAS) traffic management (UTM) data received during performance of the mission;
determining, according to the mission parameter and the mission impact data, whether vehicle operation adjustment is needed;
generating, in response to determining that the vehicle operation adjustment is needed, adjusted vehicle commands; and
controlling the vehicle according to the adjusted vehicle commands by sending, through a control arbitrator, the adjusted vehicle commands associated with the flight path to the vehicle, the controlling the vehicle, wherein the control arbitrator forwards the adjusted vehicle commands to the vehicle in response to the control arbitrator determining that the vehicle is being controlled by a single source of commands.

9. The method claim 8, wherein the generating the adjusted vehicle commands comprises generating the adjusted vehicle commands according to the mission impact data.

10. The method of claim 9, wherein the generating the adjusted vehicle commands comprises generating the adjusted vehicle commands according to the mission impact data and according to the mission performance requirements.

11. The method of claim 10, further comprising performing, before the controlling the vehicle according to the flight path:
identifying the flight path associated with the mission;
verifying a usability of the flight path with a UTM, wherein the UTM performs checking on the flight path for traffic in the flight path, availability of the flight path due to flight restrictions and requirements for use of the flight path; and
modifying the flight path according to data from the UTM in response to the UTM indicating that the usability of the flight path is not verified.

12. The method according to claim 8, wherein the monitoring the at least operation of the vehicle during performance of the mission and mission performance requirements comprises monitoring a connection between the vehicle and an access point; and
wherein the method further comprises assigning another vehicle to the mission in response to a loss of the connection.

13. The method according to claim 8, wherein the controlling the vehicle according to the adjusted vehicle commands comprises determining whether the vehicle is subject to single source control, wherein the determining whether the vehicle is subject to single source control comprises ensuring that the vehicle is subject to a single point of control at any one time; and
forwarding the adjusted vehicle commands to the vehicle in response the vehicle being subject to the single source control.

14. A fleet controller, comprising:
a processor; and
a non-transitory computer-readable storage medium storing a program for controlling a fleet of autonomous vehicles to be executed by the processor, the program including instructions for:
obtaining a mission for a vehicle of the fleet of autonomous vehicles;
identifying a flight path associated with the mission;
verifying a usability of the flight path with an unmanned aircraft system (UAS) traffic management (UTM), wherein the UTM performs checking on the flight path for at least one of traffic in the flight path, availability of the flight path due to flight restrictions, or requirements for use of the flight path;
modifying the flight path according to data from the UTM in response to the UTM indicating that the usability of the flight path is not verified; and
controlling the vehicle according to the flight path by sending, through a control arbitrator, vehicle commands associated with the flight path to the vehicle, the controlling the vehicle causing the vehicle to execute the mission, wherein the control arbitrator forwards the vehicle commands to the vehicle in response to the control arbitrator determining that the vehicle is being controlled by a single source of commands.

15. The fleet controller according to claim 14, wherein the UTM performs checking on the flight path for requirements for use of the flight path, wherein the requirements for use of the flight path comprise at least one of weight, size, minimum or maximum altitude, or airspeed.

16. The fleet controller according to claim 14, wherein the program further includes instructions for monitoring operation of the vehicle during execution of the mission by at least monitoring a connection of the vehicle to a communications network associated with the fleet controller.

17. The fleet controller according to claim 16, wherein the monitoring the connection comprises receiving, from an access point that is of the communications network and that monitors a connection between the vehicle and the access point, a last vehicle status in response to the access point determining that the connection has been lost.

18. The fleet controller according to claim 17, wherein the program further includes instructions for assigning another vehicle to the mission in response to a loss of the connection.

19. The fleet controller according to claim 16, wherein instructions for monitoring the operation of the vehicle include instructions for determining, during performance of the mission, whether mission parameters associated with the mission are supported by mission impact data received at the fleet controller; and
wherein the program further includes instructions for:
generating, in response to the mission parameters not being supported by the mission impact data, adjusted vehicle commands according to the mission impact data and the mission parameters; and sending the adjusted vehicle commands though the control arbitrator to the vehicle using the connection, the adjusted vehicle commands causing the vehicle to execute the mission under control of the fleet controller according to the adjusted vehicle command.

20. The fleet controller according to claim 19, wherein the instructions for sending the adjusted vehicle commands to the vehicle include instructions for:

determining, by the control arbitrator, whether the vehicle is subject to single source control, wherein the determining whether the vehicle is subject to single source control comprises by ensuring that vehicle commands sent to the vehicle result in the vehicle being subject to a single point of control at any one time; and sending the adjusted vehicle commands to the vehicle in response the vehicle being subject to the single source control, and further in response to the control arbitrator determining that the adjusted vehicle commands have proper authority.

\* \* \* \* \*